INVENTOR.
WARD T. COMMONS
BY
Robert W. Beach
ATTORNEY

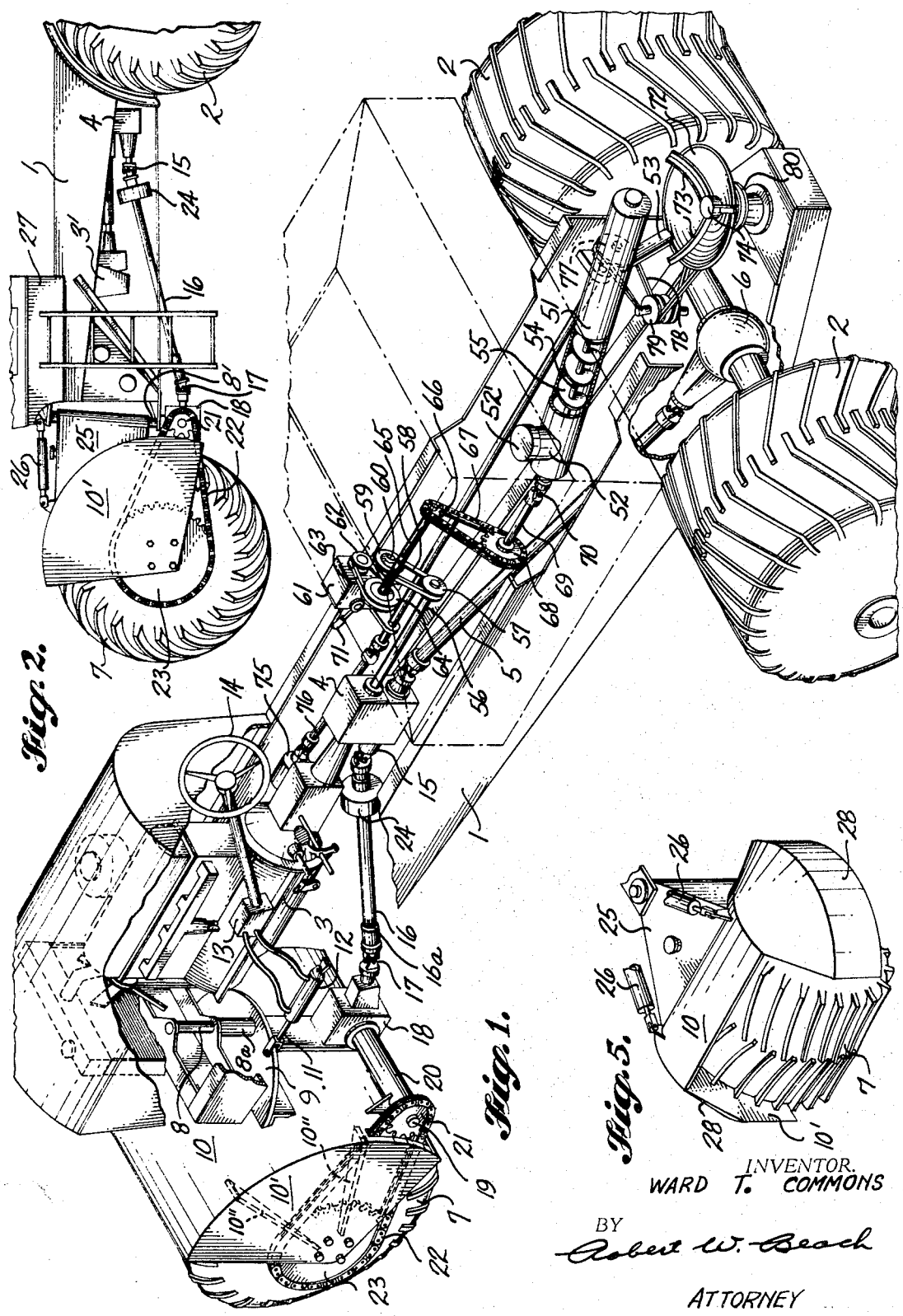

Oct. 1, 1968     W. T. COMMONS     3,403,745
TRICYCLE SWAMP BUGGY
Filed Nov. 29, 1965     3 Sheets-Sheet 3
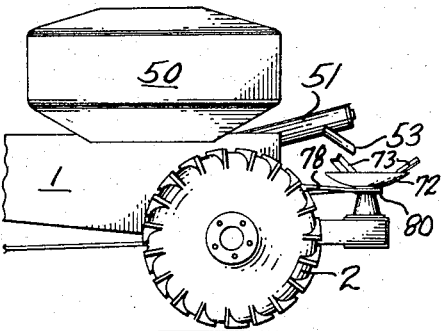
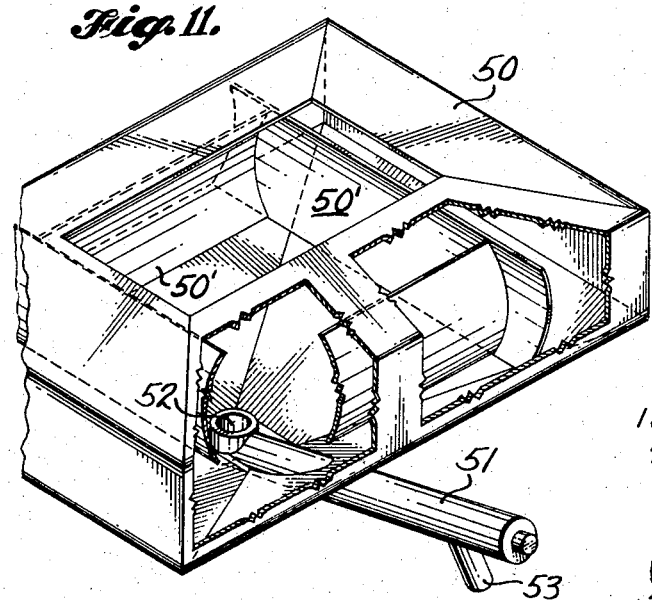
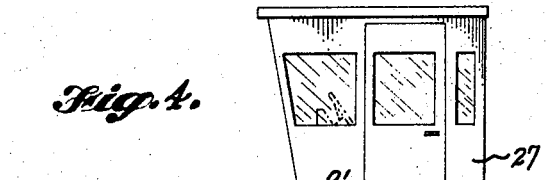
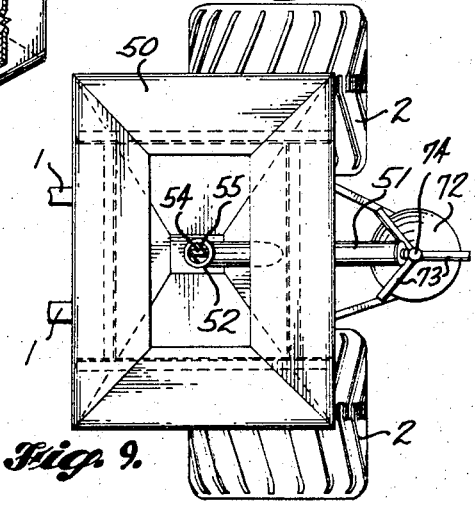
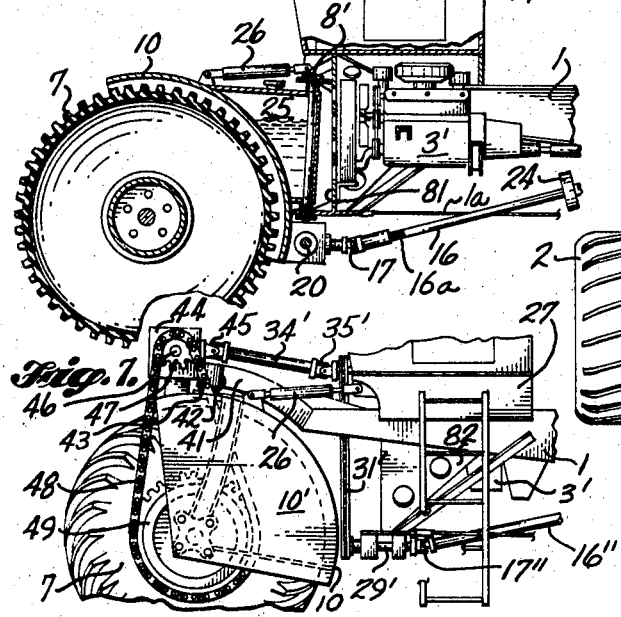
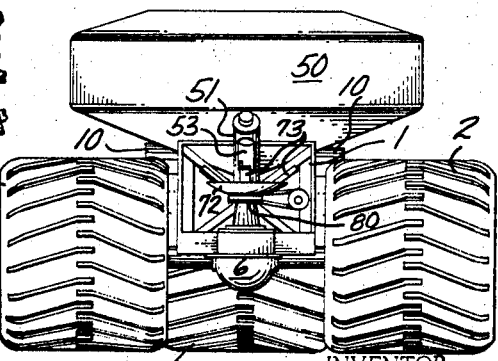
INVENTOR.
WARD T. COMMONS
BY
*Robert W. Beach*
ATTORNEY 3,403,745
TRICYCLE SWAMP BUGGY
Ward T. Commons, Halsey, Oreg. 97348
Filed Nov. 29, 1965, Ser. No. 510,205
4 Claims. (Cl. 180—26)

ABSTRACT OF THE DISCLOSURE

A tricycle vehicle for amphibious use having buoyant supporting wheels, liquid and solid dispensing apparatus for spreading fertilizer or seed, wherein the front wheel is supported by a generally vertical kingpin disposed rearwardly of the wheel to stabilize the operation of the front wheel, variable length drive means for operating the front wheel, and an overrun clutch for driving the front wheel when the rear wheels slip is disclosed.

---

This invention relates to a swamp buggy of the tricycle type, having various features increasing its utility over conventional swamp buggies.

A principal object of the present invention is to provide a swamp buggy of the tricycle type in which the chassis is supported by a single front wheel and by two rear wheels, the single front wheel being steerable. The buggy includes means to drive the front wheel as well as the rear wheels.

In a tricycle type of swamp buggy having a single front wheel and two rear wheels it is also an object to support the chassis from the front wheel by structure which is strong and rigid, and which preferably will deter vibration or other unstable traveling conditions of the swamp buggy.

It is a further object to provide a tricycle swamp buggy which can travel over rough terrain and which will be braced so as to avoid excessive distortion of the chassis.

It is additionally an object to provide such a swamp buggy which will have excellent visibility for the operator by locating the cab over the engine at the forward portion of the chassis, while providing adequate cooling facilities for the submerged engine.

These objects can be accomplished by providing a tricycle swamp buggy construction in which the single front wheel is partially enclosed by a fender having an arcuate top of approximately 90 degrees and quadrant ends fitting over the wheel and supporting the axle of the wheel. Such fender constitutes a mounting for an upright kingbolt by which the front wheel assembly is attached to the front end of the chassis so as to be swung for steering the swamp buggy. Operation of the front wheel can be stabilized by locating the steering axis of the kingbolt offset a substantial distance rearwardly from the rotative axis of the wheel. The front wheel is driven from a cross shaft supported on the fender either at the rear of the wheel or above the wheel. In either case, preferably such shaft is located adjacent to the steering axis. A universal joint located adjacent to the front wheel's steering axis may be included in a fore-and-aft drive shaft connected to such cross shaft. The control cab can be located either behind the engine or over the engine, as may be preferred, and the rear portion of the chassis can be used to support a fertilizing or seeding hopper, or such a vehicle can be used to transport various types of cargo. The front wheel drive mechanism may include an overrunning clutch so that the drive of the front wheel will be effective only when the two rear wheels do not supply sufficient traction or propulsion. If the swamp buggy is to be used for spreading fertilizer or planting seed a distributor for use in conjunction with a hopper can be provided.

FIGURE 1 is a top perspective of the swamp buggy with parts broken away.

FIGURE 2 is a side elevation of a modified type of swamp buggy with parts broken away. FIGURE 4 is a further side elevation of such swamp buggy with additional parts broken away.

FIGURE 5 is a top perspective of the front wheel assembly generally of the type shown in FIGURES 2, 3 and 4, but illustrating a modified type of front wheel housing.

Figure 6:
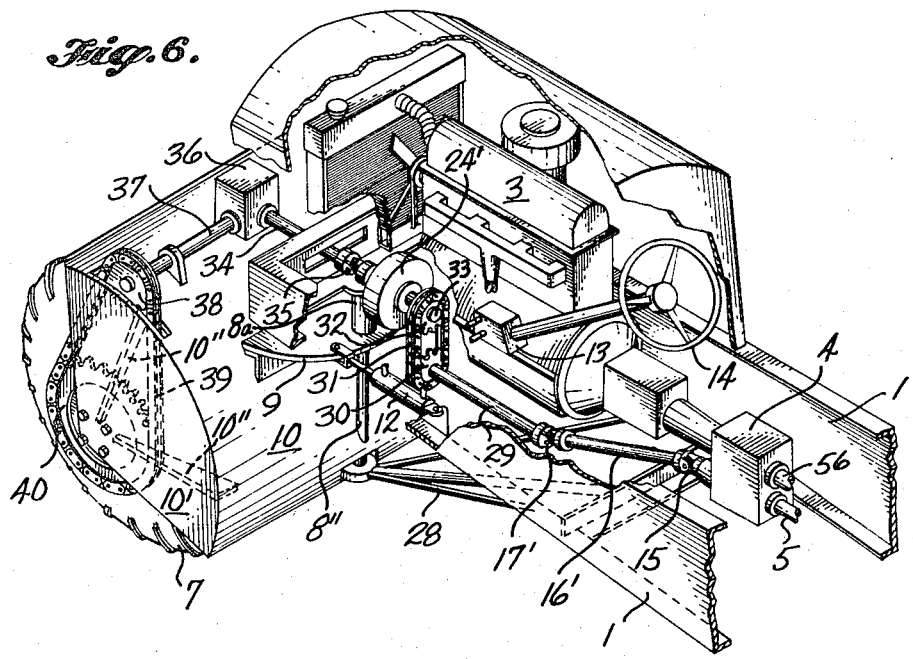

FIGURE 6 is a top perspective of the forward portion of a swamp buggy generally of the type shown in FIGURE 1, but including a modified type of front wheel drive mechanism. FIGURE 7 is a side elevation of the forward portion of a swamp buggy having front wheel drive mechanism generally similar to that shown in FIGURE 6, but using a different type of steering arrangement and having other features similar to the swamp buggy shown in FIGURES 2, 3 and 4.

FIGURE 8 shows the rear portion of a swamp buggy of the type illustrated in FIGURE 1, FIGURE 9 is a plan of such swamp buggy portion and FIGURE 10 is a rear elevation of such swamp buggy portion.

FIGURE 11 is a top perspective of the hopper portion of the swamp buggy shown in FIGURES 1, 8, 9 and 10, parts of which have been broken away.

While the swamp buggy of the present invention is suitable for use on all kinds of terrain from rough rock to water, the tricycle type of wheel arrangement is particularly advantageous when the swamp buggy is used on soft or somewhat marshy fields, the surface of which should be disturbed as little as possible by the passage of the swamp buggy over it during a fertilizer spreading or seeding operation, for example. Minimum disturbance of such a soft surface can be effected by not only distributing the weight of the vehicle over a large area, but by the supporting elements of the vehicle passing over the ground only once. It will be seen, particularly from FIGURE 10, that there is little transverse overlap between the single front wheel and the two rear wheels of the swamp buggy when such wheels are equipped with wide tread tires and the rear wheels are spaced apart a distance approximately equal to the width of the front wheel.

Pursuant to these considerations the swamp buggy illustrated in the drawings includes a chassis 1 composed principally of two interconnected side channels having upper and lower flanges projecting inward, the rear end portion of which is suitably supported by spaced rear wheels 2 driven by an engine 3 supported by the chassis adjacent to its forward end. Such drive is effected by the engine driving a transmission 4 which effects turning of a drive shaft or propeller shaft 5 connected to a differential gear mechanism 6 which interconnects the axles of the two wheels 2. The front portion of the chassis is supported by the single wheel 7 which preferably is of an axial length substantially equal to the spacing between the two rear wheels 2, as shown in FIGURE 10, and for the reasons discussed above.

In order to enable the swamp buggy to be steered the front wheel 7 is swingable relative to the chassis 1 about the axis of a kingbolt 8 by which the chassis is supported from the front wheel. As shown best in FIGURE 1, the kingbolt 8 extends downward from the chassis into or through a sleeve 8a mounted on a supporting plate 9, which in turn is mounted rigidly on the fender 10 extending over the wheel 7. This fender is of rugged construction so as to be able to transmit the weight of the front portion of the chassis 1 including the engine 3 to the wheel 7.

The structure of the fender assembly is shown particularly in FIGURES 1 and 2 of the drawing as including the arcuate top portion 10, which subtends a substantial angle, such as approximately 90 degrees, and is curved substantially concentrically with the rotative axis of wheel 7. This upper portion of the fender is connected to the wheel by sector end plate 10' which are preferably approximately quadrants in extent. The axle of wheel 7 is then mounted suitably on the inwardly facing sides of the quadrant end plates 10' adjacent to their apexes. Strengthening and stiffening for such end plates may be provided by attaching to their inner surfaces radially extending ribs 10", indicated in broken lines in FIGURES 1, 3 and 6.

To control the steering of the swamp buggy by swinging the front wheel 7 relative to the chassis 1, hydraulic steering mechanism can be used which includes a plunger 11 connected to the supporting plate 9 at a location offset from the axis of the kingbolt 8 and having its end remote from such supporting plate received reciprocably in the hydraulic cylinder 12. The plunger can be reciprocated in such cylinder by hydraulic liquid supplied to one end portion or the other end portion of such cylinder from a hydraulic actuator 13, operation of which is effected by turning of the steering wheel 14. The particular construction of such hydraulic steering mechanism by itself is not part of the present invention.

It will be seen in FIGURE 1 that the turning axis of kingbolt 8 is offset a substantial distance rearwardly from the rotative axis of the front wheel 7. It has been found that application of the weight of the front portion of the swamp buggy chassis to the front wheel fender structure at a location offset rearwardly a substantial distance from the rotative axis of the wheel 7 of the kingbolt will tend to produce a greater bending stress in such kingbolt than if it were close to the axis of wheel rotation. In addition, the spacing between the axis of rotation of the wheel 7 and the turning axis of the kingbolt 8 will cause the wheel to execute an orbital movement around the axis of the kingbolt instead of the wheel simply swiveling relative to such axis.

The advantage of offsetting the axis of the kingbolt from the axis of the front wheel 7, however, is that the operation of the vehicle is greatly stabilized during its movement over somewhat rough terrain and in turning. The sustained stress which is exerted on the kingbolt maintains the relationship between the chassis and the front wheel in a steady condition, whereas if the axis of the kingbolt and the axis of the front wheel are adjacent to each other the stresses on the kingbolt may reverse so that the front wheel will tend to oscillate forward and rearward relative to the chassis. Such tendency to position reversal causes vibration of the entire vehicle.

Offsetting of the axis of the kingbolt 8 and of the rotative axis of the front wheel 7, however, does create structural problems and it has been found that such problems are solved effectively by forming the fender 10, 10', 10", described above, as a structural component of the vehicle on which the supporting plate 9 and kingbolt sleeve 8a are mounted to transmit the load of the chassis front end from the kingbolt to the front wheel axle. Additionally, such offset relationship of the kingbolt axis and front wheel axle creates a problem for providing drive mechanism for the front wheel. This problem is solved by the present invention so that all wheels of the vehicle can be driven positively.

The drive for the front wheel 7 of the swamp buggy is effected from the transmission 4 powered by the engine 3. From such transmission a shaft 15 extends forwardly which may turn at the same speed as the rear drive shaft 5 connected to the differential 6 for the rear wheels 2, as described above. Shaft 15 is connected through a universal joint to a forward drive shaft 16 which in turn is connected by a second universal joint 17 to an angle drive gearbox 18. This gearbox drives a cross shaft 19 which extends parallel to the axis of front wheel 7 and is supported by suitable bearings in the shaft housing 20 mounted on the fender 10. The outer end of this shaft carries a sprocket 21 which drives a chain 22 to turn sprocket 23 mounted on the axle of the wheel 7. The size of the sprockets 21 and 23 will be selected with reference to the speed of shafts 16 and 19 so that the circumferential speed of the wheel 7 will be approximately the same as the circumferential speed of the rear wheels 2 as driven by the drive shaft 5 and differential 6.

Particularly when the swamp buggy is used on soft, marshy and slippery ground, provision of drive mechanism for all wheels of the vehicle is advantageous. Such an arrangement will minimize skidding of the rear wheels with accompanying churning of the soft ground. Another situation in which the provision of a front wheel drive is definitely advantageous is when the swamp buggy is moving from water onto land. The tires of the wheels 2 and 7 are sufficiently large and buoyant to float the entire vehicle and the treads of the rear tires are shown as being provided with generally axial ribs or cleats to provide propulsion on water. There is necessarily, however, substantial slippage between the circumference of the wheels and the water. Particularly if the vehicle is climbing onto the shore the action of the rear wheels may be inadequate to move the vehicle quickly and positively up the incline.

When the swamp buggy is traversing hard ground or rock where traction is good the drive action afforded by the rear wheels will be satisfactory. It is preferred, however, to provide a front wheel drive which will become operative automatically when the rear wheels being to slip under conditions such as suggested above. This purpose is accomplished by providing in the drive shaft 16 an overrunning clutch 24 and selecting the drive mechanism components so that when the circumference of front wheel 7 is turning at the same peripheral speed as the circumferences of the two rear wheels 2, the shaft 16 will be turned by rotation of the front wheel at a speed just slightly greater than the speed at which shaft 15 is driven by the transmission 4. Normally, therefore, clutch 24 will allow shaft 16 to overrun shaft 15.

As soon as the wheels 2 begin to slip relative to the ground or water on which they bear, the peripheral speed of wheel 7 will become less than the peripheral speed of wheels 2 and, consequently, the speed of shaft 16 will decrease sufficiently so that shaft 15 will drive shaft 16 positively through the action of clutch 24 to rotate front wheel 7 positively in turn so that its traction will be added to that of rear wheels 2 for the purpose of propelling the swamp buggy. Since shaft 15 and shaft 5 are both driven by the same transmission 4, these shafts will always rotate at the same relative speed irrespective of different speed ratios for which the transmission 4 may be adjusted. At all driving ratios of the transmission, therefore, the same automatic control for effecting positive drive of the front wheel 7 will be operative.

In order to enable the front wheel 7 to be powered in the manner described above, despite the offset of the kingbolt axis rearwardly from the rotative axis of the wheel 7, the angle drive gearbox 18 is located so that the axis of shaft 19 extending transversely of the vehicle, the fore-and-aft axis of the drive shaft for the angle drive 18, and the upright axis for the kingbolt 8 will substantially intersect. The universal joint 17 will enable the angle drive 18 to be driven in all swung positions of the front wheel without placing any bending stress in drive shaft 16. Moreover, such drive shaft includes a splined connection 16a which is variable in effective lengths to avoid the possibility of any tension or compression stresses being produced in the drive shaft as a result of the front wheel being swung. Consequently, the front wheel drive mechanism described above is effective to drive the front wheel in all of its swung positions.

Figure 3:
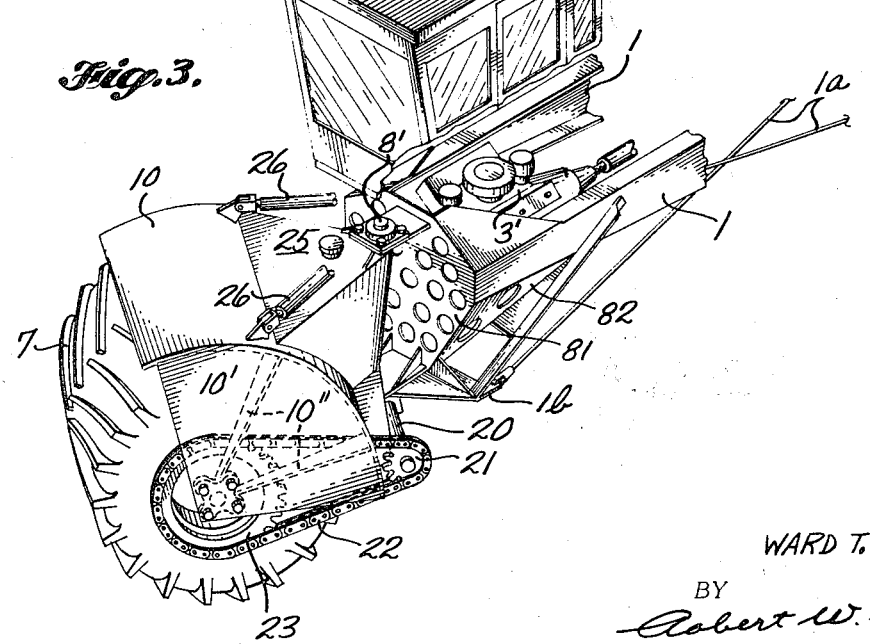
FIGURE 3 is a top perspective of the front portion of such a swamp buggy with parts broken away.

In FIGURES 2, 3 and 4 a somewhat different arrangement of swamp buggy components is illustrated which utilize the same principles as discussed above. In this instance the kingbolt 8' is connected at both its upper end and its lower end to the front end of the frame 1, and the intermediate portion of the kingbolt extends through, and may have a suitable bearing connection with, an auxiliary hollow structure 25 mounted on the fender 10 of the front wheel in lieu of the supporting plate structure 9, as shown best in FIGURE 3. This hollow structure can be of generally triangular horizontal cross section and may serve as an auxiliary fuel tank. For an installation of this type the steering mechanism is shown as including two hydraulic jacks 26 connected respectively to lugs projecting upwardly from the fender 10 above the hollow structure 25. Such jacks are double-acting and act oppositely.

In the vehicle of FIGURES 2, 3 and 4, the operator's cab 27 is shown as being located directly over the engine 3' and this engine is mounted in a position in which most of it is submerged in the frame. Such cab location clears the rear portion of the chassis for carrying loads, either in a suitable container or on a flatbed, as may be preferred. Also, such cab location greatly improves the visibility of the operator.

Particularly where the cab is moved forward to the location shown in FIGURES 2, 3 and 4, the load on the front wheel 7 may be increased to a point where the buoyancy of such wheel would be insufficient to float the vehicle approximately level in water. Under such circumstances it is desirable to increase the buoyancy of the front portion of the swamp buggy and this result can be accomplished by providing auxiliary flotation tanks on opposite ends of the front wheel fender 10, as shown in FIGURE 5. In order to reduce impediment of such tanks to movement of the swamp buggy through the water, tanks 28 can have flat inner sides coinciding with the fender ends 10' and outer sides curved in plan. The upper portions of such tanks can be faired into the upper end portions of the fender ends, as shown in FIGURE 5. If the vehicle is to be used entirely for a land operation such auxiliary flotation chambers can be utilized as additional fuel tanks, if desired, and can communicate with the hollow structure 25 for this purpose.

In FIGURE 6 the engine and chassis arrangement of the swamp buggy is like that of FIGURE 1, but the drive mechanism for the front wheel 7 is located in a different position. In this instance the drive connection 15 to the transmission 4 is connected to the drive shaft 16' and this shaft is connected by a universal joint 17' to a forward section 29 of the drive shaft extending fore and aft. Such forward section carries a sprocket 30 which drives a chain 31 engaged with another sprocket 32 mounted on a shaft 33. Such shaft is located above the upper end of the kingbolt 8", which is offset rearwardly from the rotative axis of the front wheel 7 a distance approximately equal to the offset of the kingbolt 8 from the wheel axis shown in FIGURE 1.

Instead of the kingbolt 8", shown in FIGURE 6, being mounted in a cantilever fashion in the frame above the sleeve 8a, as shown in FIGURE 1, the upper end of such kingbolt is connected only to the lower portion of the chassis frame above the sleeve 8a. Such sleeve is mounted on plate 9 carried by the fender. Kingbolt 8" extends downward through such sleeve and continues downward to and through the lower rear edge of the fender 10. The lower end of the kingbolt is then carried by a bracing structure attached to the frame, shown as a wishbone 28. By attaching both the upper and lower ends of the kingbolt to the frame it is not necessary to extend the upper portion of the kingbolt through the depth of the frame, as is shown in the cantilever construction of FIGURE 1. Room is thus provided for passage of the shaft 33 over the upper end of the kingbolt within the chassis structure.

Extending forwardly from shaft 33 beyond the location of the kingbolt 8" is a shaft 34 which is connected to shaft 33 by a universal joint 35. The forward end of shaft 34 is connected to the angle drive gearbox 36 mounted on top of the fender 10, and such gearbox is connected to drive the horizontal transverse shaft 37 carrying sprocket 38. This sprocket in turn drives chain 39 extending downwardly alongside one end of the front wheel 7 between it and the end quadrant plate 10' of the wheel fender assembly. Sprocket 40, carried by the shaft of the front wheel 7, is driven by such chain.

The alternate overhead type of front wheel drive shown in FIGURE 6, and described above, includes in drive shaft 33 an overrunning clutch 24' which will provide automatic control for effecting power drive of the front wheel 7 when the rear wheels 2 start to slip, as has been discussed above. By locating the universal joint 35 in registry with the upright steering axis of the kingbolt 8", the shaft 34 can be driven effectively without binding of any parts of the front wheel drive mechanism occurring as the front wheel is moved orbitally around the axis of the kingbolt for steering the swamp buggy. In order to provide clearance for swinging of shaft 34 as the front wheel swings, such shaft extends through a transverse slot in the front frame member of a length great enough so that the shaft will not engage the slot ends when the front wheel has been swung to its most extreme steering positions.

In FIGURE 7 another arrangement for supporting the front end of the chassis on the front wheel 7 and driving such wheel is shown. In this instance the operator's cab 27 again is shown as being located above the engine 3', as shown in FIGURES 2, 3 and 4. The drive mechanism for the front wheel is located in an overhead position similar to the arrangement of FIGURE 6. The principal departure of the mechanism shown in this figure from that previously described is in the location of the steering axis. In this instance such steering axis and the rotative axis of the front wheel 7 are at least located adjacent to each other and may intersect.

The front portion of the chassis 1 has a tongue 41 extending forwardly from it which terminates in an enlargement 42 providing a mounting for the kingbolt 43. The lower end of such kingbolt may be secured directly on the upper portion of the fender 10 and extend upward through an upright bore in the enlargement serving as a bearing for the kingbolt. Preferably as shown, the axis of the kingbolt will be inclined slightly forwardly and downwardly to provide caster-producing forces for returning the wheel 7 to its centered position from a position swung to one side or the other of such centered position when the steering wheel is released.

The drive mechanism for the front wheel 7 in this instance is generally similar to that disclosed in FIGURE 6, including the drive shaft 16" from the transmission which is connected by universal joint 17" to a lower shaft 29'. This lower shaft drives the chain 31' and an upper shaft to turn the forward upper shaft section 34' by universal joint 35'. The forward end of shaft 34' is connected to the angle drive gearbox 44 by a universal joint 45 which is located in registry with the steering axis of the kingbolt 43. As wheel 7 is swiveled about the axis of the kingbolt the universal joint 45 will be deflected so as to maintain an effective driving connection between the upper shaft 34' and the angle drive gearbox 44 in all swung positions of wheel 7. The remainder of the drive mechanism from the angle drive gearbox 44 to the front wheel is quite similar to that shown in FIGURE 6, including the transverse shaft 46 connected to the angle drive which carries sprocket 47 engaged with chain 48 that drives the sprocket 49 mounted on the wheel axle. Shaft 16" will include a suitable overrunning clutch similar to the clutch 24 of the mechanism shown in FIGURE 1.

A typical use for the swamp buggy of the present invention is as a fertilizer spreader or a seeder. For this purpose a hopper 50, shown in FIGURES 8 to 11, can be mounted on the rear portion of the chassis 1. A discharge tube 51 for the hopper contents extends rearwardly from the bottom portion of the hopper and has an inlet 52 opening upwardly into the hopper. Near its rearward end an outlet tube or trough 53 extends downwardly from the tube 51. Particulate material such as fertilizer or seed can be moved along the discharge tube 51 by a screw conveyor including a shaft 54 concentric with such tube, and carrying a helical strip 55. Such helix is convoluted with relation to the direction of rotation of shaft 54 so that such shaft rotation will propel particulate material from the inlet opening 52 of the tube to the outlet tube or trough 53.

To rotate shaft 54 a shaft 56 driven by the engine can be provided extending aft from the transmission 4. This shaft turns pulley 57 to drive belt 58 for rotating pulley 59 mounted on shaft 60 of a speed reducer 61. Through pulley 62, belt 63 and pulley 64 a fore and aft shaft 65 is driven to rotate sprocket 66 engaged with chain 67, which also is engaged with sprocket 68 carried by shaft 69. This shaft is connected to shaft 54 of the screw conveyor by a universal joint 70. Thus, the screw conveyor for the fertilizer or seed dispenser can be driven from the engine 3 and, by manipulation of a control 71 for the speed reducer 61, the speed of rotation of the screw conveyor can be regulated, as well as the drive being energized or deenergized.

Particulate material discharged from the tube 51 by the tube or trough spout 53 is deposited in the distributor or spreader 72. Such spreader includes an upwardly concave pan in which distributor arms 73 revolve, mounted on shaft 74. Such shaft is rotated by a power take-off of the engine 3, which in turn drives shaft 76 carrying pulley 77 to drive belt 78 engaged with it. This belt extends around pulley guiding means 79 and pulley 80 secured on shaft 74. As the distributor arms 73 are whirled by rotation of shaft 74, the particulate fertilizer or seed supplied to the distributor by the spout 53 is broadcast.

Where the engine is submerged in the frame, such as being located beneath the cab 27, as shown in FIGURES 2 to 4, it is desirable to provide adequate ventilation such as by location ahead of the engine radiator a perforated plate 81. The side plates 82 adjacent to the forward portion of the engine may also be perforated, as shown best in FIGURE 3. Also it is desirable to provide adequate bracing for a deep narrow chassis to deter twisting of the chassis as it is stressed by movement of the swamp buggy over uneven ground. For this purpose diagonal tie rods 1a, shown in FIGURES 1 and 4, may be provided to stiffen the chassis structure.

While the hopper 50 has been described for use in spreading fertilizer or as a seeder, such hopper can be used to haul liquid. For such use, the inlet 52 to the screw conveyor will be closed by a liquid-tight cover 52' as shown in FIGURE 1. Baffles 50' having inner concave sides can be provided at locations spaced from the sides of the hopper. These baffles will deflect liquid moving toward them transversely of the hopper into paths flowing upward and inward so as to reduce sloshing of the liquid in the tank, as shown in FIGURE 11.

I claim as my invention:

1. A tricycle swamp buggy comprising a unitary chassis, a pair of spaced apart rear wheels, a single front wheel having a width approximately equal to the spacing between the rear wheels supported by forward portion of the chassis by means of a forwardly extending enlargement on the chassis, a fender extending over the front wheel and mounting the same, and an upright kingbolt connected to the fender and extending through a passageway formed in the enlargement on the chassis, drive means mounted on the fender forwardly of the kingbolt for driving the front wheel, a universal joint operably connected to the drive means extending rearwardly therefrom, said universal joint having a vertically disposed axis in axial alignment with the kingbolt and a drive shaft secured to the universal joint for rotation thereof extending rearwardly for being driven by a power means in the swamp buggy, whereby steering of the swamp buggy may be accomplished by pivotal movement of the fender about the kingbolt axis, the front wheel being maintained in driving relation as the drive means secured to the front fender pivots about the vertical axis of the universal joint.

2. A swamp buggy comprising a unitary chassis, a single front wheel supporting the forward portion of said chassis by means of an upright kingbolt connected approximately vertically to said chassis and to said front wheel, having its axis offset rearwardly a substantial distance from the rotative axis of said front wheel proximate the rear edge of said front wheel and guiding said front wheel for arcuate swinging relative to said chassis to steer the swamp buggy for stabilizing the operation of said front wheel and including means mounting the kingbolt on a fender, said means including a hollow structure having a generally triangular horizontal cross section.

3. A swamp buggy comprising a unitary chassis, a single front wheel supporting the forward portion of said chassis by means of a generally vertical kingbolt positioned rearwardly of said wheel connecting said chassis and said front wheel for swiveling of said front wheel relative to said chassis, a drive shaft disposed rearwardly alongside said front wheel and having its axis extending generally parallel to the axis of the front wheel and disposed adjacent to the turning axis of said kingbolt, and means connecting said drive shaft to said wheel to effect rotation of said wheel by rotation of said drive shaft for stabilizing the operation of the front wheel and a drive means for the drive shaft including a universal joint and a connection to the universal joint variable in extent lengthwise of the swamp buggy.

4. A swamp buggy comprising a unitary chassis, a front wheel supporting the forward portion of said chassis by means of an upright kingbolt connected approximately vertically to said chassis and to said front wheel having its axis offset rearwardly a substantial distance from the rotative axis of said front wheel proximate the rear edge of said front wheel and guiding said front wheel for arcuate swinging relative to said chassis to steer the swamp buggy for stabilizing the operation of said front wheel and including two spaced wheels supporting the rearward portion of said chassis, an engine carried by said chassis, first drive means connecting said engine to said front wheel, second drive means connecting said engine to said two rear wheels, and clutch means in said first drive means for operatively connecting said engine to said front wheel through said first drive means when said rear wheels are slipping.

References Cited

UNITED STATES PATENTS

| | | | |
|---|---|---|---|
| 684,516 | 10/1901 | Leechman | 180—26 |
| 971,471 | 9/1910 | Peterson et al. | 115—19 |
| 2,177,991 | 10/1939 | Maddock | 280—106 |
| 2,435,021 | 1/1948 | Seider | 180—26 |
| 2,635,703 | 5/1953 | Goeller | 280—211 X |
| 2,649,162 | 8/1953 | Wooldridge et al. | 180—13 |
| 2,930,439 | 5/1960 | Alig et al. | 180—20 |
| 2,959,201 | 11/1960 | LeTourneau | 180—20 X |
| 3,096,841 | 7/1963 | May | 180—31 |
| 3,101,806 | 8/1963 | Salna | 180—52 |
| 3,268,025 | 8/1966 | Fehn | 180—31 |

KENNETH H. BETTS, *Primary Examiner.*